United States Patent
Fujiwara

(10) Patent No.: US 11,089,231 B2
(45) Date of Patent: Aug. 10, 2021

(54) IMAGE CAPTURING APPARATUS, IMAGE CAPTURING METHOD, AND PROGRAM

(71) Applicant: FUJIFILM Corporation, Tokyo (JP)

(72) Inventor: Shinya Fujiwara, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/932,836

(22) Filed: Jul. 20, 2020

(65) Prior Publication Data
US 2020/0351428 A1 Nov. 5, 2020

Related U.S. Application Data

(63) Continuation of application No. PCT/JP2019/001518, filed on Jan. 18, 2019.

(30) Foreign Application Priority Data

Mar. 9, 2018 (JP) .............................. JP2018-043382

(51) Int. Cl.
H04N 5/235 (2006.01)

(52) U.S. Cl.
CPC ......... *H04N 5/2353* (2013.01); *H04N 5/2355* (2013.01)

(58) Field of Classification Search
CPC .... H04N 5/2353; H04N 5/2355; H04N 5/232; G03B 7/093; G03B 15/00
See application file for complete search history.

(56) References Cited

U.S. PATENT DOCUMENTS 8,830,360 B1 * 9/2014 Burt ................... H04N 5/23277
348/241
2007/0177035 A1 8/2007 Hatano
(Continued)

FOREIGN PATENT DOCUMENTS

| JP | 2007201985 | 8/2007 |
| JP | 2011147008 | 7/2011 |

(Continued)

OTHER PUBLICATIONS

"International Search Report (Form PCT/ISA/210) of PCT/JP2019/001518," dated Feb. 26, 2019, with English translation thereof, pp. 1-5.

(Continued)

*Primary Examiner* — Jason A Flohre
(74) *Attorney, Agent, or Firm* — JCIPRNET

(57) ABSTRACT

An image capturing apparatus having an imaging sensor and a processor configured to set n different exposure times for n successive frames, where n is an integer equal to or larger than two; control the imaging sensor to capture the n successive frames with the set n exposure times so as to make a blank period between frames shorter than the n exposure times; acquire n pieces of image data of the n successive frames captured by the imaging sensor; and generate a composite frame for recording or displaying a motion picture of an extended dynamic range from the n pieces of image data, wherein the processor is further configured to set the n exposure times so that a sum of the n exposure times matches a time for n frames for the composite frame or a time for one frame for the composite frame in accordance with a brightness of a photographic subject captured by the imaging sensor.

17 Claims, 7 Drawing Sheets

(56) References Cited

U.S. PATENT DOCUMENTS

| | | | | |
|---|---|---|---|---|
| 2009/0262218 | A1* | 10/2009 | Makii | H04N 5/23232 |
| | | | | 348/239 |
| 2010/0328497 | A1 | 12/2010 | Hatano | |
| 2011/0176028 | A1 | 7/2011 | Toyoda | |
| 2011/0242368 | A1* | 10/2011 | Haneda | H04N 5/2355 |
| | | | | 348/239 |
| 2012/0268617 | A1* | 10/2012 | Ishikawa | H04N 5/23245 |
| | | | | 348/221.1 |
| 2014/0016001 | A1* | 1/2014 | Ichikawa | H04N 5/2355 |
| | | | | 348/229.1 |
| 2015/0237247 | A1* | 8/2015 | Hara | H04N 5/2353 |
| | | | | 348/362 |
| 2018/0097983 | A1* | 4/2018 | Park | H04N 5/35536 |

FOREIGN PATENT DOCUMENTS

| | | |
|---|---|---|
| JP | 2011259375 | 12/2011 |
| JP | 2014017681 | 1/2014 |
| JP | 2016208402 | 12/2016 |

OTHER PUBLICATIONS

"Written Opinion of the International Searching Authority (Form PCT/ISA/237) of PCT/JP2019/001518," dated Feb. 26, 2019, with English translation thereof, pp. 1-9.

\* cited by examiner

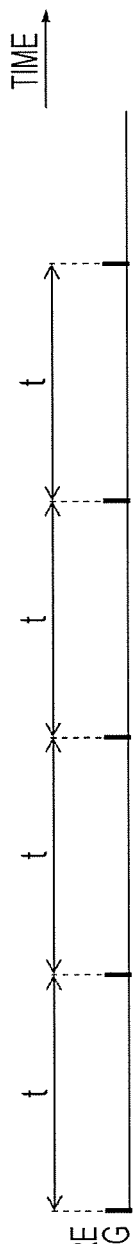
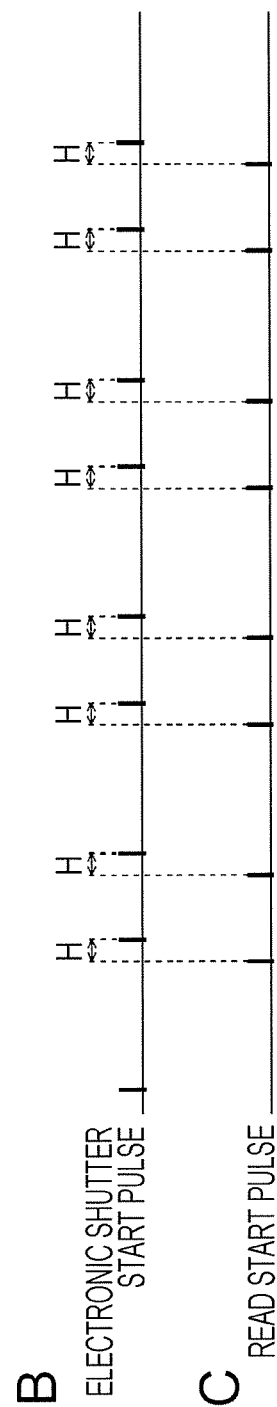
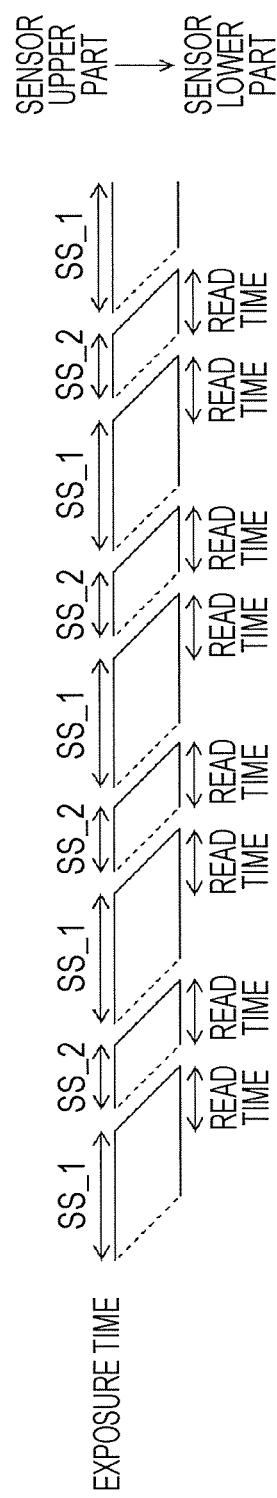
FIG. 9A fps FOR MOTION PICTURE CAPTURING
FIG. 9B ELECTRONIC SHUTTER START PULSE
FIG. 9C READ START PULSE
FIG. 9D EXPOSURE TIME

IMAGE CAPTURING APPARATUS, IMAGE CAPTURING METHOD, AND PROGRAM

CROSS-REFERENCE TO RELATED APPLICATIONS

This application is a Continuation of PCT International Application No. PCT/JP2019/001518 filed on Jan. 18, 2019, which claims priority under 35 U.S.C § 119(a) to Japanese Patent Application No. 2018-043382 filed on Mar. 9, 2018. Each of the above applications is hereby expressly incorporated by reference, in its entirety, into the present application.

BACKGROUND OF THE INVENTION

1. Field of the Invention

The present invention relates to an image capturing apparatus, an image capturing method, and a program and specifically relates to a technique for acquiring a motion picture for which dynamic range extension processing is performed.

2. Description of the Related Art

When, for example, a digital camera is used to acquire a captured image of a photographic subject (or a scene) of a wide dynamic range, blown-out highlights in a highlight part or blocked-up shadows in a shadow part may appear. As a method for suppressing such blown-out highlights and blocked-up shadows to express the dynamic range of the photographic subject wider, dynamic range extension processing (HDR (high-dynamic-range) processing) is available.

For example, JP2011-259375A describes a technique in which a long-exposure image and a short-exposure image are combined to acquire a motion picture of a wide dynamic range (extended dynamic range). The technique described in JP2011-259375A is intended to eliminate unnatural movement of a moving object in the motion picture caused by the difference between a blank period (exposure interval) from the end of long exposure to the start of short exposure and a blank period from the end of short exposure to the start of long exposure, and the technique is used to make the above-described two blank periods equal to each other.

SUMMARY OF THE INVENTION

To acquire an image of a wide dynamic range, a method is available in which a plurality of images for which the luminous exposures are different are combined. As a method for acquiring images for which the luminous exposures are different, a method is available in which the same aperture and the same ISO sensitivity are used while the exposure time is made different. In this method, the exposure time is set with reference to the brightness of the photographic subject, and thereafter, the exposure time of a frame for which the luminous exposure is to be larger is made longer and the exposure time of a frame for which the luminous exposure is to be smaller is made shorter.

However, when the exposure time is set with reference to only the brightness of the photographic subject, a blank period during which exposure is not performed may be present. In such a case of a blank period, in an acquired motion picture, connections between frames may become unnatural or a residual image may appear in a case where the photographic subject moves or camera shake occurs. Therefore, it is desirable to make the blank period shorter to the extent possible to capture a frame for which the luminous exposure is larger and a frame for which the luminous exposure is smaller.

The present invention has been made in view of such circumstances, and an object thereof is to provide an image capturing apparatus, an image capturing method, and a non-transitory computer readable medium for storing a program that make the blank period shorter to the extent that almost no attention is required, thereby acquiring a motion picture in which connections between frames are made smooth and the appearance of a residual image caused by a moving-object image or camera shake is suppressed.

To achieve the above-described object, an image capturing apparatus according to an aspect of the present invention includes: an imaging unit; an exposure time setting unit that sets n different exposure times for n respective frames, where n is an integer equal to or larger than two; an exposure control unit that controls exposure for each frame successively captured by the imaging unit, and that makes exposure times of n successive frames different in accordance with the set n exposure times (n numbers of exposure times) and makes a blank period between frames shorter to an extent that almost no attention is required relative to the n exposure times to perform exposure; an image data acquisition unit that acquires from the imaging unit pieces of image data of the n successive frames for which exposure is controlled and for which the exposure times are different; and a composite frame generation unit that generates a composite frame for recording or displaying a motion picture of an extended dynamic range from n pieces of image data that are the acquired pieces of image data. The exposure time setting unit sets the n exposure times so that a sum of the n exposure times and a time for n frames for the composite frame match, or sets the n exposure times so that the sum of the n exposure times and a time for one frame for the composite frame match.

According to this aspect, the exposure time setting unit sets the n exposure times so that the sum of the n exposure times and the time for n frames for the composite frame match. According to this aspect, the exposure time setting unit sets the n exposure times so that the sum of the n exposure times and the time for one frame for the composite frame match. Accordingly, with this aspect, the exposure control unit can make the exposure times of the n successive frames different in accordance with the set n exposure times and make the blank period between frames shorter to the extent that almost no attention is required relative to the n exposure times to perform exposure.

Preferably, the exposure time setting unit switches, in accordance with a brightness of a photographic subject for which image capturing is performed by the imaging unit, between exposure time setting in which the sum of the n exposure times and the time for n frames for the composite frame are made to match and exposure time setting in which the sum of the n exposure times and the time for one frame for the composite frame are made to match.

According to this aspect, the exposure time setting unit switches, in accordance with the brightness of a photographic subject for which image capturing is performed by the imaging unit, between setting in which the sum of the n exposure times and the time for n frames for the composite frame are made to match and setting in which the sum of the n exposure times and the time for one frame for the composite frame are made to match.

Preferably, in a case of calculating the n exposure times and making the sum of the n exposure times and the time for n frames for the composite frame match, the exposure time setting unit calculates the n exposure times on the basis of expression (1) below.

$$SS\_i = \left( \frac{(t \times n) \times 2^{\Delta Ev\_i}}{\sum_{k=1}^{n} 2^{\Delta Ev\_k}} \right) - (n \times H) \quad (1)$$

t: the number of seconds per motion picture frame
n: the number of composition target frames for acquiring the composite frame
H: a time lag necessary between a read start pulse and an electronic shutter start pulse
SS_i: the exposure time for acquiring each piece of image data
i: a natural number from 1 to n representing a number of each composition target frame
ΔEv_i: an exposure difference from a brightest composition target frame Preferably, in a case of calculating the n exposure times and making the sum of the n exposure times and the time for one frame for the composite frame match, the exposure time setting unit calculates the n exposure times on the basis of expression (2) below.

$$SS\_i = \left( \frac{t \times 2^{\Delta Ev\_i}}{\sum_{k=1}^{n} 2^{\Delta Ev\_k}} \right) - (n \times H) \quad (2)$$

t: the number of seconds per motion picture frame
n: the number of composition target frames for acquiring the composite frame
H: a time lag necessary between a read start pulse and an electronic shutter start pulse
SS_i: the exposure time for acquiring each piece of image data
i: a natural number from 1 to n representing a number of each composition target frame
ΔEv_i: an exposure difference from a brightest composition target frame Preferably, the exposure time setting unit sets the n exposure times on the basis of exposure information stored in a storage unit.

According this aspect, the exposure time setting unit sets the n exposure times on the basis of the exposure information stored in the storage unit.

Preferably, the blank period is a time lag between reading of image data from the imaging unit and a start of exposure for new image data.

Here, the time lag means a time between reading of image data from the imaging unit and the start of exposure for new image data.

An image capturing method according to another aspect of the present invention includes: an exposure time setting step of setting n different exposure times for n respective frames, where n is an integer equal to or larger than two; an exposure control step of controlling exposure for each frame successively captured by an imaging unit, and making exposure times of n successive frames different in accordance with the set n exposure times and making a blank period between frames shorter to an extent that almost no attention is required relative to the n exposure times to perform exposure; an image data acquisition step of acquiring from the imaging unit pieces of image data of the n successive frames for which exposure is controlled and for which the exposure times are different; and a composite frame generation step of generating a composite frame for recording or displaying a motion picture of an extended dynamic range from n pieces of image data that are the acquired pieces of image data. The exposure time setting step includes setting the n exposure times so that a sum of the n exposure times and a time for n frames for the composite frame match, or setting the n exposure times so that the sum of the n exposure times and a time for one frame for the composite frame match.

Preferably, in a case of calculating then exposure times and making the sum of the n exposure times and the time for n frames for the composite frame match, the exposure time setting step includes calculating the n exposure times on the basis of expression (1) below.

$$SS\_i = \left( \frac{(t \times n) \times 2^{\Delta Ev\_i}}{\sum_{k=1}^{n} 2^{\Delta Ev\_k}} \right) - (n \times H) \quad (1)$$

t: the number of seconds per motion picture frame
n: the number of composition target frames for acquiring the composite frame
H: a time lag necessary between a read start pulse and an electronic shutter start pulse
SS_i: the exposure time for acquiring each piece of image data
i: a natural number from 1 to n representing a number of each composition target frame
ΔEv_i: an exposure difference from a brightest composition target frame Preferably, in a case of calculating the n exposure times and making the sum of the n exposure times and the time for one frame for the composite frame match, the exposure time setting step includes calculating the n exposure times on the basis of expression (2) below.

$$SS\_i = \left( \frac{t \times 2^{\Delta Ev\_i}}{\sum_{k=1}^{n} 2^{\Delta Ev\_k}} \right) - (n \times H) \quad (2)$$

t: the number of seconds per motion picture frame
n: the number of composition target frames for acquiring the composite frame
H: a time lag necessary between a read start pulse and an electronic shutter start pulse
SS_i: the exposure time for acquiring each piece of image data
i: a natural number from 1 to n representing a number of each composition target frame
ΔEv_i: an exposure difference from a brightest composition target frame A non-transitory computer readable medium for storing a program according to yet another aspect of the present invention causes a computer to perform an process including: an exposure time setting step of setting n different exposure times for n respective frames, where n is an integer equal to or larger than two; an exposure control step of controlling exposure for each frame successively captured by an imaging unit, and making exposure times of n successive frames different in accordance with the set n exposure times and making a blank period between frames shorter to an extent that almost no attention is required relative to the n exposure times to perform exposure; an image data acquisition step of acquiring from the imaging unit pieces of image data of the n successive frames for which exposure is controlled and for which the exposure times are different; and a composite frame generation step of generating a composite frame for recording or displaying a motion picture of an extended dynamic range from n pieces of image data that are the acquired pieces of image data. The exposure time setting step includes an image capture process for setting the n exposure times so that a sum of the n exposure times and a time for n frames for the composite frame match, or an image capture process for setting the n exposure times so that the sum of the n exposure times and a time for one frame for the composite frame match.

According to the present invention, the exposure time setting unit can set the n exposure times so that the sum of the n exposure times and the time for n frames for the composite frame match, or the exposure time setting unit can set the n exposure times so that the sum of the n exposure times and the time for one frame for the composite frame match. The exposure control unit can make the exposure times of the n successive frames different in accordance with the set n exposure times and make the blank period between frames shorter to the extent that almost no attention is required relative to the n exposure times to perform exposure. Therefore, a motion picture in which connections between frames are smooth and the appearance of a residual image caused by movement of the photographic subject or camera shake is suppressed can be acquired.

BRIEF DESCRIPTION OF THE DRAWINGS

FIGS. 9A to 9D are timing charts of exposure for composition target frames; and

DESCRIPTION OF THE PREFERRED EMBODIMENTS

Hereinafter, preferred embodiments of an image capturing apparatus, an image capturing method, and a program according to the present invention will be described with reference to the attached drawings.

Figure 1:
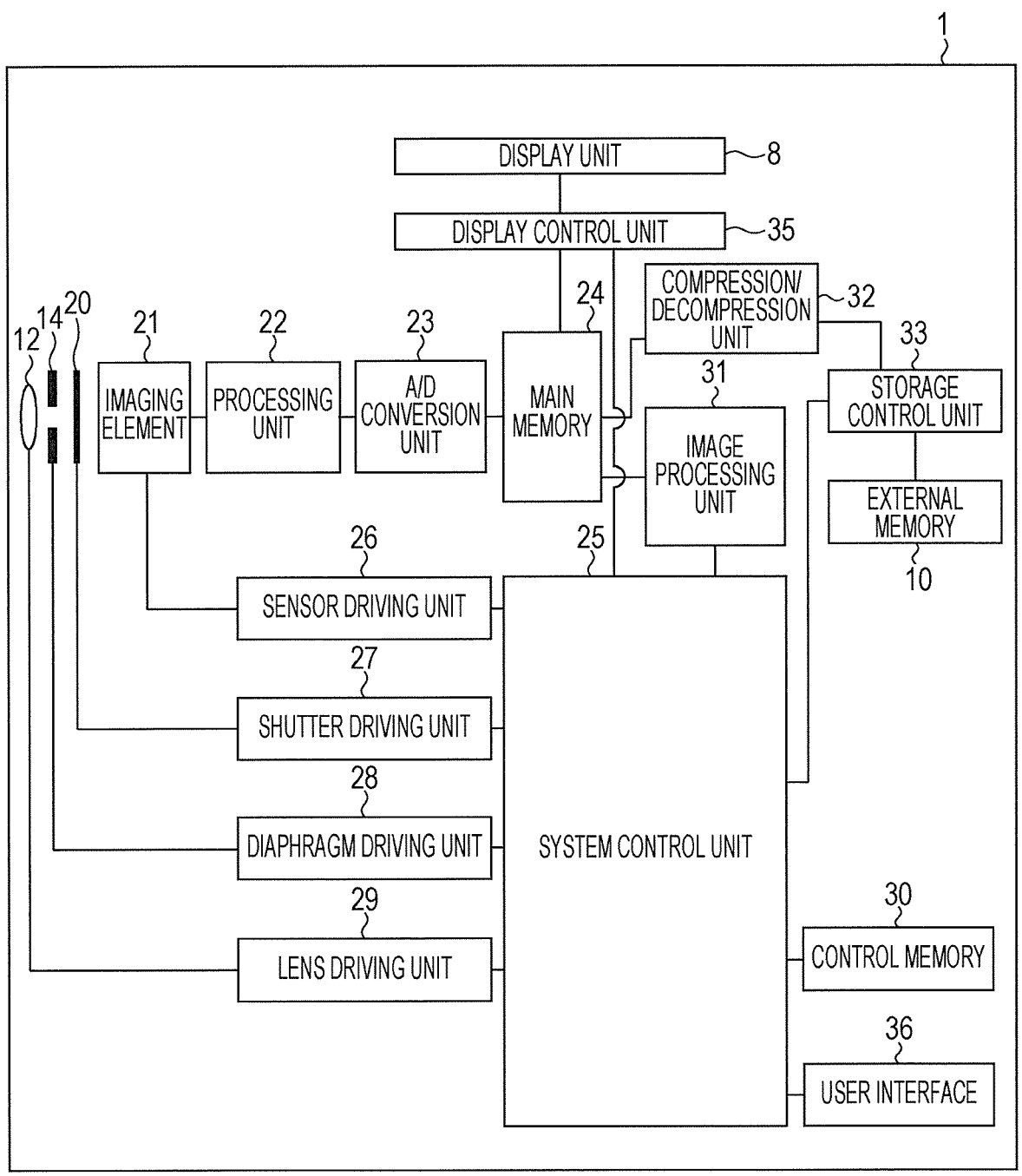
FIG. 1 is a block diagram illustrating a control processing system of an image capturing apparatus.

FIG. 1 is a block diagram illustrating a control processing system of an image capturing apparatus 1.

Photographic subject light passes through a lens 12, a diaphragm 14, and a mechanical shutter 20 and is received by an imaging element (imaging unit) 21. The lens 12 is formed of an image capture optical system including an image capture lens and the diaphragm 14. The imaging element 21 is an element that receives light of a photographic subject image to generate image capture signals (image data), and has color filters of, for example, R, G, and B (red, green, and blue) and an image sensor, such as a CCD (charge-coupled device) image sensor or a CMOS (complementary metal-oxide semiconductor) image sensor, that converts an optical image to electric signals. The image data output from the imaging element 21 is input to a processing unit 22 and is subjected to processing by, for example, an AGC (automatic gain control) circuit, and thereafter, the image data, which is analog data, is converted to digital image data by an A/D (analog/digital) conversion unit 23. The digital image data is saved in a main memory 24.

The main memory 24 is an area for temporarily storing image data and is formed of, for example, a DRAM (dynamic random access memory). The image data sent from the A/D conversion unit 23 and stored in the main memory 24 is read by an image processing unit 31 that is controlled by a system control unit 25.

The image processing unit 31 uses the image data generated by the imaging element 21 as input image data to perform various types of image processing including white balance correction, gamma correction, and demosaicing and save the image data after image processing in the main memory 24 again.

The image processing unit 31 generates a composite frame of an extended dynamic range. Generation of a composite frame by the image processing unit 31 will be described below. Note that a composite frame subjected to dynamic range extension processing is hereinafter referred to as "composite frame of a wide dynamic range". Further, a composite frame of a wide dynamic range is formed of frames, which are referred to as "composition target frames".

The image data subjected to image processing by the image processing unit 31 and saved in the main memory 24 is read by a display control unit 35 and a compression/decompression unit 32. The display control unit 35 controls a display unit 8 to display the image data read from the main memory 24 on the display unit 8. Accordingly, the image data output from the imaging element 21 and subjected to image processing by the image processing unit 31 is displayed on the display unit 8 as an image-capture check image (post-view image).

The compression/decompression unit 32 performs compression processing on the image data read from the main memory 24 to generate image data in any compression format, such as JPEG (Joint Photographic Experts Group) or TIFF (Tagged Image File Format). The image data after compression processing is stored in an external memory 10 by a storage control unit 33 that controls data storage processing for storage in the external memory 10 and data read processing for reading from the external memory 10. Image-capture information in any format is added to image data. As the format, for example, Exif (Exchangeable image file format) can be employed.

When a push of a shutter button in a first step (half push) is detected, an AF processing function of the image capturing apparatus 1 integrates the absolute values of high-frequency components of image data corresponding to an AF area that are taken at the time of half push, and outputs the integrated value (AF evaluation value) to the system control unit 25.

When a push of the shutter button in the first step (half push) is detected, an AE detection function integrates digital signals corresponding to the entire screen or integrates image data in which the center part and the edge part of the screen are differently weighted, and outputs the integrated value to the system control unit 25.

As described above, the system control unit 25 controls the main memory 24, the image processing unit 31, and the storage control unit 33 and also controls other parts (AF processing function and AE detection function) of the image capturing apparatus 1.

When the shutter button is half-pushed in an auto-image capture mode, the system control unit 25 activates the AE detection function. The system control unit 25 calculates the luminance of the photographic subject (image-capture Ev value) on the basis of the integrated value input from the AE detection function, and determines the aperture of the diaphragm 14 to be driven via a diaphragm driving unit 28 and the shutter speed (charge storage time of the mechanical shutter 20 and/or the imaging element 21) on the basis of the image-capture Ev value in accordance with a program diagram.

When the shutter button is fully pressed, the system control unit 25 controls the diaphragm 14 on the basis of the determined aperture and controls the mechanical shutter 20 via a shutter driving unit 27 on the basis of the determined shutter speed. The charge storage time of the imaging element 21 is controlled by a sensor driving unit 26.

When the shutter button is half-pushed in the auto-image capture mode, the system control unit 25 moves a focus lens of the lens 12 from a close point to the infinity side via a lens driving unit 29 and activates the AF processing function to acquire an AF evaluation value at each lens position from the AF processing function. The system control unit 25 searches for an in-focus position at which the AF evaluation value is at its maximum, and moves the focus lens to the in-focus position, thereby adjusting the focal point for the photographic subject. The system control unit 25 acquires information about the in-focus position on the basis of the position to which the focus lens is moved.

The system control unit 25 acquires operation signals from a user interface 36 that includes the shutter button, a power switch, and an operation unit, and performs various types of processing and device control corresponding to the operation signals.

Programs and data necessary for the various types of processing and device control performed by the system control unit 25 are stored in the main memory 24. The system control unit 25 can read programs and data stored in a control memory 30 and save new programs and data in the control memory 30 as necessary.

Figure 2:
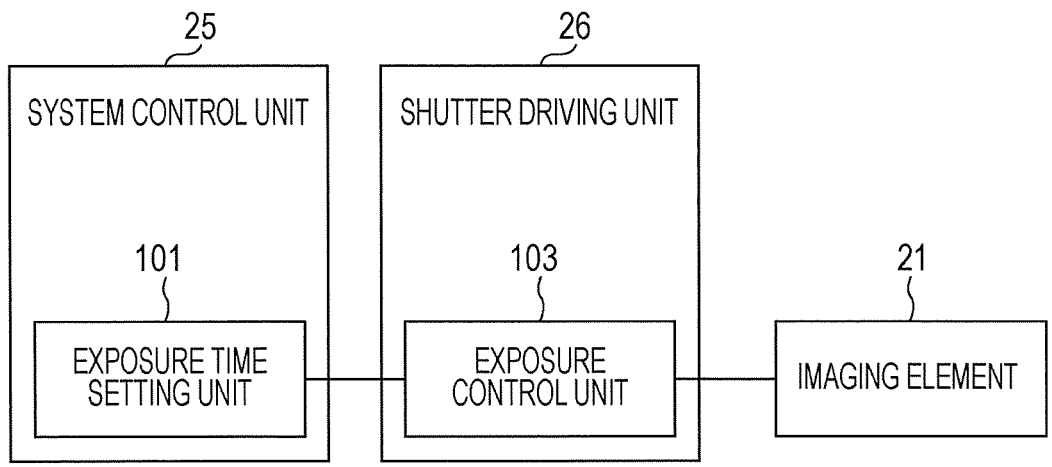
FIG. 2 is a block diagram illustrating an example functional configuration related to exposure time setting and exposure control.

Now, exposure time setting and exposure control according to the present invention are described. FIG. 2 is a block diagram illustrating an example functional configuration related to the exposure time setting and exposure control.

The system control unit 25 includes an exposure time setting unit 101. The exposure time setting unit 101 sets the exposure time of each composition target frame for generating a composite frame. That is, in a case where a composite frame is formed of n composition target frames, the exposure time setting unit 101 sets n different exposure times for the n respective frames.

The exposure time setting unit 101 sets the exposure times of the n frames so that the sum of the n exposure times (n numbers of the exposure times) and the time for n frames for the composite frame match. The exposure time setting unit 101 sets the n exposure times so that the sum of the n exposure times and the time for one frame for the composite frame match. Although described below, a time lag between reading of image data from the imaging element 21 and the start of exposure for new image data is present between composition target frames.

The shutter driving unit 27 has an exposure control unit 103 for exposure control in the imaging element 21. The exposure control unit 103 controls exposure for frames successively captured by the imaging element 21.

Figure 3:
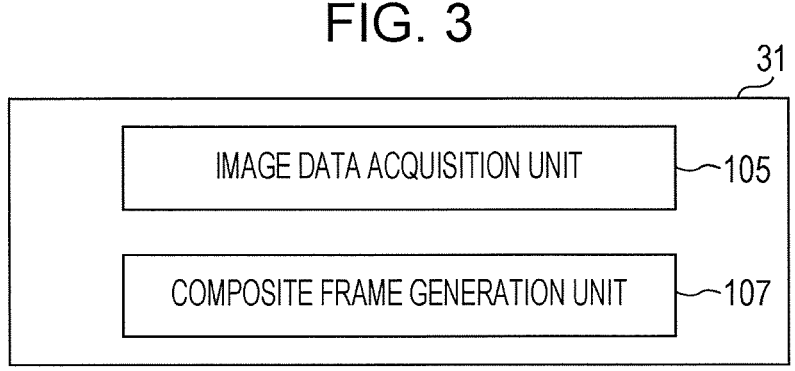
FIG. 3 is a block diagram illustrating an example functional configuration of an image processing unit.

FIG. 3 is a block diagram illustrating an example functional configuration of the image processing unit 31. The image processing unit 31 includes an image data acquisition unit 105 and a composite frame generation unit 107.

The image data acquisition unit 105 acquires image data of each frame from the imaging unit for which exposure is controlled. Specifically, the image data acquisition unit 105 acquires from the main memory 24 pieces of image data of composition target frames that are output from the imaging element 21 and for which the exposure times are different one after another as one set.

The composite frame generation unit 107 generates from acquired n pieces of image data of the composition target frames a composite frame for recording or displaying a motion picture of an extended dynamic range. Note that n is an integer equal to or larger than two.

Figure 4:
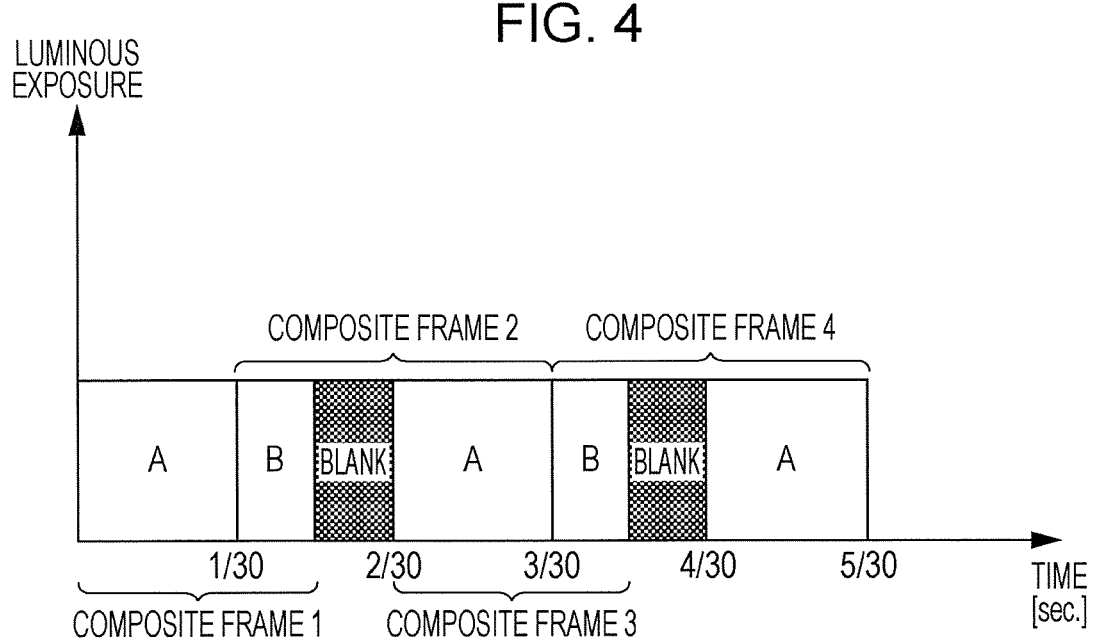
FIG. 4 is a diagram for explaining a method for exposure time setting according to the related art.

FIG. 4 is a diagram for explaining a method for exposure time setting according to the related art. In FIG. 4, the vertical axis represents a luminous exposure per unit time, and the horizontal axis represents the time.

A composite frame of a wide dynamic range is formed of composition target frames, that is, a frame for which the luminous exposure is large (frame A) and a frame for which the luminous exposure is small (frame B). The frame A and the frame B are captured at 30 fps (frames per second), that is, acquired every $\frac{1}{30}$ second. Note that the frame A and the frame B are acquired with the same ISO sensitivity and the same aperture (f number) and become frames for which the luminous exposures are different by changing the exposure times.

The exposure time of the frame A is set to $\frac{1}{30}$ second, and the exposure time of the frame B is set to a time shorter than $\frac{1}{30}$ second. Then, a blank period is present at the timing of capturing the frame B. The blank period is a period during which exposure is not performed. The blank period in the exposure time setting method according to the related art is a period that is longer than a time lag described below and has a length that requires attention relative to the exposure times of the frame A and the frame B.

A blank period is present after capturing of the frame B, and connections between a composite frame 1, a composite frame 2, a composite frame 3, and a composite frame 4 become unnatural. In the composite frame 2 and in the composite frame 4, a blank period is present between composition target frames, that is, the frame A and the frame B, and a residual image caused by a moving-object image or camera shake appears.

First Embodiment

Now, a first embodiment of the present invention is described.

Figure 5:
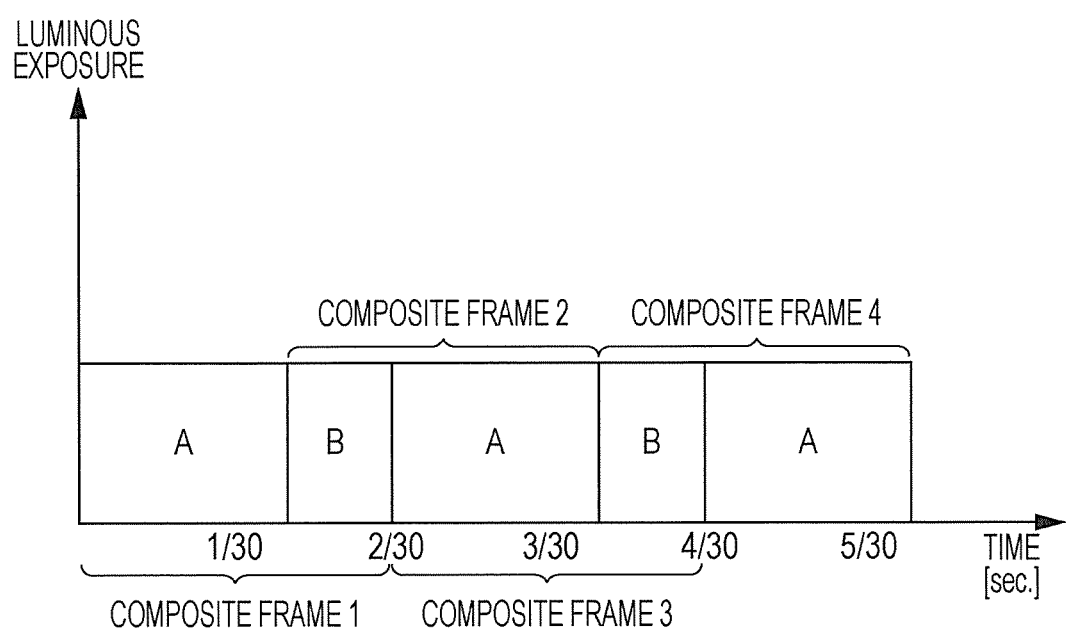
FIG. 5 is a diagram for explaining exposure for composition target frames.

FIG. 5 is a diagram for explaining exposure for composition target frames that form a composite frame according to this embodiment. In FIG. 5, the vertical axis represent a luminous exposure per unit time, and the horizontal axis represents the time as in FIG. 4.

In this embodiment, in a case where a composite frame is formed of n composition target frames, the exposure time setting unit 101 sets the exposure time of each frame in accordance with the brightness of a photographic subject for which image capturing is performed by the imaging unit so that the sum of the n exposure times and the time for n frames for the composite frame match. Specifically, the exposure times of two frames, namely, the frame A and the frame B, that form the composite frame are set so that a blank period is not substantially provided in a period of ⅔₀ seconds. When the exposure times of the frame A and the frame B are thus set, the blank period can be made shorter to the extent that almost no attention is required relative to the exposure times of the frame A and the frame B. That is, the period during which exposure is not performed includes only a time lag. The state where a blank period is not substantially provided corresponds to a case where, for example, any blank period other than a time lag H described below is not provided.

FIGS. 6A to 6D are timing charts of exposure for the composition target frames illustrated in FIG. 5.

Figure 6:
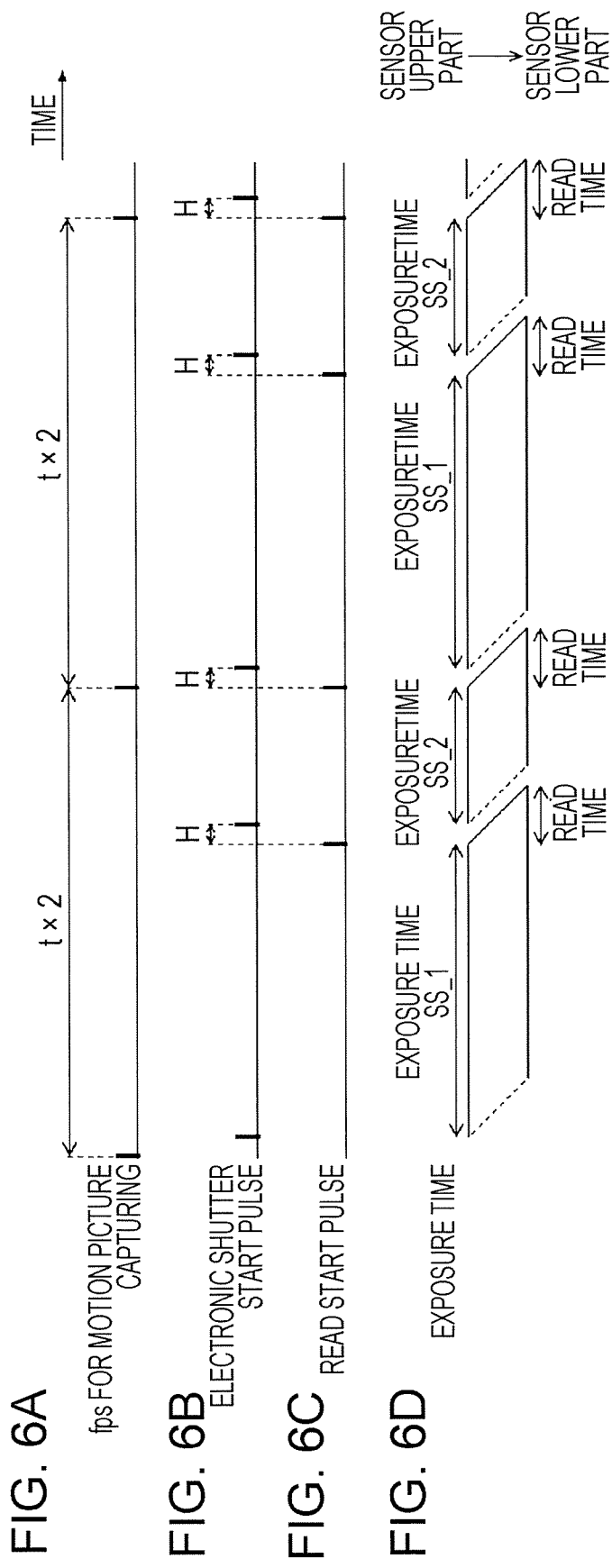
FIGS. 6A to 6D are timing charts of exposure for composition target frames.

FIG. 6A illustrates the timing (fps) for motion picture capturing, FIG. 6B illustrates the timing of an electronic shutter start pulse, FIG. 6C illustrates the timing of a read start pulse, and FIG. 6D illustrates the exposure time of the frame A (SS_1) and the exposure time of the frame B (SS_2).

The time for motion picture capturing is set in advance or can be set by a user. For example, a motion picture is captured at 30 fps or 60 fps. In the case illustrated in FIGS. 6A to 6D, two composition target frames are captured at 30 fps, and FIG. 6A illustrates the timing of (1/30)×2 seconds.

The electronic shutter start pulse and the read start pulse illustrated in FIG. 6B and FIG. 6C are output from the exposure control unit 103. Specifically, the exposure control unit 103 outputs the electronic shutter start pulse and the read start pulse in accordance with the exposure time SS_1 and the exposure time SS_2 set by the exposure time setting unit 101.

The time lag H illustrated by FIGS. 6B and 6C is described. The time lag H is a time lag necessary between the read start pulse and the electronic shutter start pulse. The time lag H is very short to the extent that almost no attention is required relative the exposure time SS_1 and the exposure time SS_2. For example, the time lag H is a period corresponding to the minimum number of clocks necessary for minimizing the blank period, and the actual time is about 10 microseconds. The time lag H is a period equal to or shorter than 0.1% of the frame rate. Therefore, the time lag H is shorter to the extent that almost no attention is required relative to the exposure times of the frame A and the frame B.

In a case of calculating the n exposure times and making the sum of the n exposure times and the time for n frames for the composite frame match, the exposure time setting unit 101 calculates the n exposure times on the basis of expression (1) below.

$$SS\_i = \left( \frac{(t \times n) \times 2^{\Delta Ev\_i}}{\sum_{k=1}^{n} 2^{\Delta Ev\_k}} \right) - (n \times H) \quad (1)$$

t: the number of seconds per motion picture frame
n: the number of composition target frames for acquiring the composite frame
H: the time lag necessary between the read start pulse and the electronic shutter start pulse
SS_i: the exposure time for acquiring each piece of image data
i: a natural number from 1 to n representing the number of each composition target frame
ΔEv_i: the exposure difference from the brightest composition target frame Specifically, when a case is assumed where a motion picture is captured at 30 fps, a composite frame of a wide dynamic range is generated from two frames, the exposure difference between the two frames is 1 Ev, and H is close to 0, the exposure time SS_1 of the frame A and the exposure time SS_2 of the frame B are calculated as follows.

$$SS\_1 = \left( \frac{(1/30) \times 2) \times 2^0}{2^0 + 2^{-1}} \right) - (2 \times 0) \approx 2/45 \; [\text{sec}]$$

$$SS\_2 = \left( \frac{(1/30) \times 2) \times 2^{-1}}{2^0 + 2^{-1}} \right) - (2 \times 0) \approx 1/45 \; [\text{sec}]$$

Adding up the exposure time SS_1 and the exposure time SS_2 thus calculated results in ⅔₀ seconds, which is the period for two frames when a motion picture is captured at 30 fps.

Figure 7:
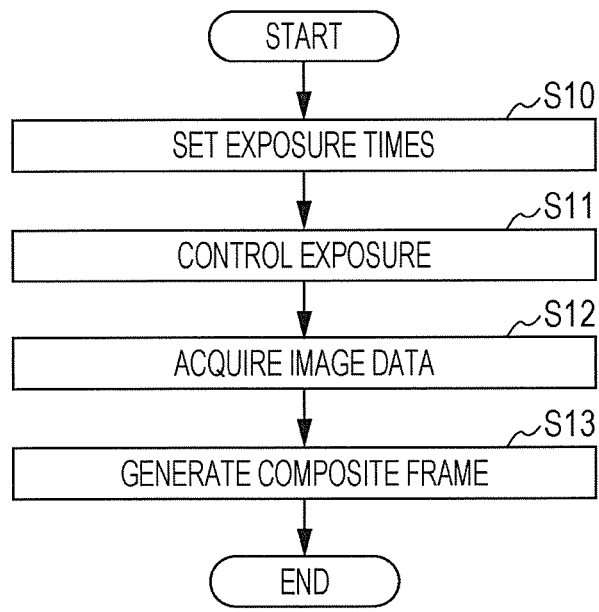
FIG. 7 is a flowchart illustrating operations of the image capturing apparatus.

Now, an image capture process according to the present invention is described. FIG. 7 is a flowchart illustrating operations of the image capturing apparatus 1.

The exposure time setting unit 101 sets the exposure times of frames A and B that form a composite frame (step S10: exposure time setting step). The exposure times of the frame A and the frame B are respectively set to SS_1 and SS_2 using expression (1) above.

Thereafter, the exposure control unit 103 controls exposure on the basis of the exposure times set by the exposure time setting unit 101 (step S11: exposure control step). Specifically, the exposure control unit 103 first outputs the electronic shutter start pulse to cause the imaging element 21 to start exposure for the frame A. After the elapse of the exposure time SS_1, the exposure control unit 103 outputs the read start pulse to start reading of image data of the frame A. Next, the exposure control unit 103 outputs the electronic shutter start pulse after the period of the time lag H to cause the imaging element 21 to start exposure for the frame B. After the elapse of the exposure time SS_2, the exposure control unit 103 outputs the read start pulse to start reading of image data of the frame B.

Thereafter, the image data acquisition unit 105 acquires the pieces of image data of the frame A and the frame B (step S12: image data acquisition step). Next, the composite frame generation unit 107 generates a composite frame from the acquired pieces of image data of the frame A and the frame B (step S13: composite frame generation step).

As described above, in this embodiment, the exposure time setting unit 101 sets the n exposure times so that the sum of the n exposure times and the time for n frames for the composite frame match, and pieces of image data of frames corresponding to the exposure times are acquired. Accordingly, the blank period can be made shorter to the extent that almost no attention is required relative to the n exposure times, and a motion picture in which connections between frames are smooth and the appearance of a residual image caused by movement of the photographic subject or camera shake is suppressed can be acquired. Further, in this embodiment, the exposure times are made longer than the exposure times determined in a second embodiment described below, and therefore, image capturing can be performed with low sensitivity even for a dark scene, and a motion picture in which noise is suppressed can be acquired.

In the above-described embodiment, the hardware configuration of the processing units that perform various types of processing is implemented as various processors as described below. The various processors include a CPU (central processing unit), which is a general-purpose processor executing software (program) to function as various processing units, a programmable logic device (PLD), such as an FPGA (field-programmable gate array), which is a processor having a circuit configuration that is changeable after manufacture, and a dedicated electric circuit, such as an ASIC (application-specific integrated circuit), which is a processor having a circuit configuration specifically designed to perform specific processing.

One processing unit may be configured as one of the various processors or two or more processors of the same type or different types (for example, a plurality of FPGAs or a combination of a CPU and an FPGA). Further, a plurality of processing units may be configured as one processor. As the first example of configuring a plurality of processing units as one processor, a form is possible where one or more CPUs and software are combined to configure one processor, and the processor functions as the plurality of processing units, a representative example of which is a computer, such as a client or a server. As the second example thereof, a form is possible where a processor is used in which the functions of the entire system including the plurality of processing units are implemented as one IC (integrated circuit) chip, a representative example of which is a system on chip (SoC). As described above, regarding the hardware configuration, the various processing units are configured by using one or more of the various processors described above.

Further, the hardware configuration of the various processors is more specifically an electric circuit (circuitry) in which circuit elements, such as semiconductor elements, are combined.

The above-described configurations and functions can be implemented as any hardware, software, or a combination thereof as appropriate. For example, the present invention is applicable to a program that causes a computer to perform the above-described processing steps (processing procedure), a computer-readable recording medium (non-transitory recording medium) to which such a program is recorded, or a computer on which such a program can be installed.

Second Embodiment

Now, the second embodiment of the present invention is described. In this embodiment, setting is performed so that the sum of the exposure times of composition target frames matches the time for one frame for a motion picture.

Figure 8:
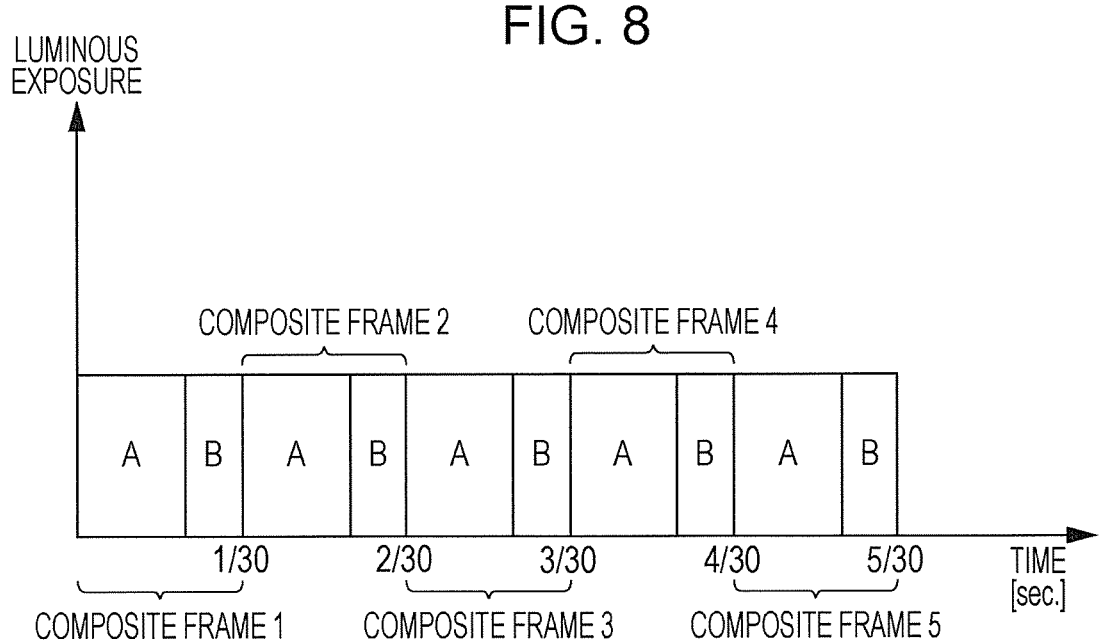
FIG. 8 is a diagram for explaining exposure for composition target frames.

FIG. 8 is a diagram for explaining exposure for composition target frames according to this embodiment. In FIG. 8, the vertical axis represents a luminous exposure per unit time, and the horizontal axis represents the time as in FIG. 4.

In this embodiment, in a case where a composite frame is formed of n composition target frames, the exposure time setting unit 101 sets the exposure time for each frame in accordance with the brightness of a photographic subject for which image capturing is performed by the imaging unit so that the sum of the n exposure times and the time for one frame for the composite frame match. Specifically, the exposure times of two frames, namely, the frame A and the frame B, forming the composite frame are set so that a blank period is not substantially provided in a period of ⅟30 second.

FIGS. 9A to 9D are timing charts of exposure for the composition target frames illustrated in FIG. 8. FIGS. 9A to 9D illustrate matters similar to those in FIGS. 6A to 6D.

FIGS. 9A to 9D illustrate a case where a motion picture is captured at 30 fps.

In a case of calculating the n exposure times and making the sum of the n exposure times and the time for one frame for the composite frame match, the exposure time setting unit 101 calculates the n exposure times on the basis of expression (2) below.

$$SS\_i = \left( \frac{t \times 2^{\Delta Ev\_i}}{\sum_{k=1}^{n} 2^{\Delta Ev\_k}} \right) - (n \times H) \quad (2)$$

t: the number of seconds per motion picture frame
n: the number of composition target frames for acquiring the composite frame
H: the time lag necessary between the read start pulse and the electronic shutter start pulse
SS_i: the exposure time for acquiring each piece of image data
i: a natural number from 1 to n representing the number of each composition target frame
ΔEv_i: the exposure difference from the brightest composition target frame Specifically, when a case is assumed where a motion picture is captured at 30 fps, a composite frame is generated from two composition target frames, the exposure difference between the two frames is 1 Ev, and H is close to 0, the exposure time SS_1 of the frame A and the exposure time SS_2 of the frame B are calculated as follows.

$$SS\_1 = \left( \frac{(1/30) \times 2^0}{2^0 + 2^{-1}} \right) - (2 \times 0) \approx 2/90 \ [\text{sec}]$$

$$SS\_2 = \left( \frac{(1/30) \times 2^{-1}}{2^0 + 2^{-1}} \right) - (2 \times 0) \approx 1/90 \ [\text{sec}]$$

Adding up the exposure time SS_1 and the exposure time SS_2 thus calculated results in ⅟30 second, which is the period for one frame when a motion picture is captured at 30 fps.

As described above, in this embodiment, the exposure time setting unit 101 sets the exposure times so that the sum of the exposure times of n composition target frames and the time for one frame for the composite frame match, and pieces of image data of frames corresponding to the exposure times are acquired. Accordingly, the blank period can be made shorter to the extent that almost no attention is required relative to the n exposure times, and a motion picture in which connections between frames are smooth and the appearance of a residual image caused by movement of the photographic subject or camera shake is suppressed can be acquired. Further, in this embodiment, the exposure times are shorter than those in the first embodiment, and therefore, image capturing can be performed with high sensitivity even for a bright scene, and an exposure associating area can be made wider.

Third Embodiment

Now, a third embodiment of the present invention is described. In this embodiment, switching is performed between exposure time setting performed in a first exposure time determination method (first embodiment) and exposure time setting performed in a second exposure time determination method (second embodiment). Specifically, the exposure time setting unit 101 uses exposure time setting in which the sum of n exposure times and the time for n frames for a composite frame match or exposure time setting in which the sum of n exposure times and the time for one frame for a composite frame match in a switching manner in accordance with the brightness of a photographic subject for which image capturing is performed by the imaging unit.

Figure 10:
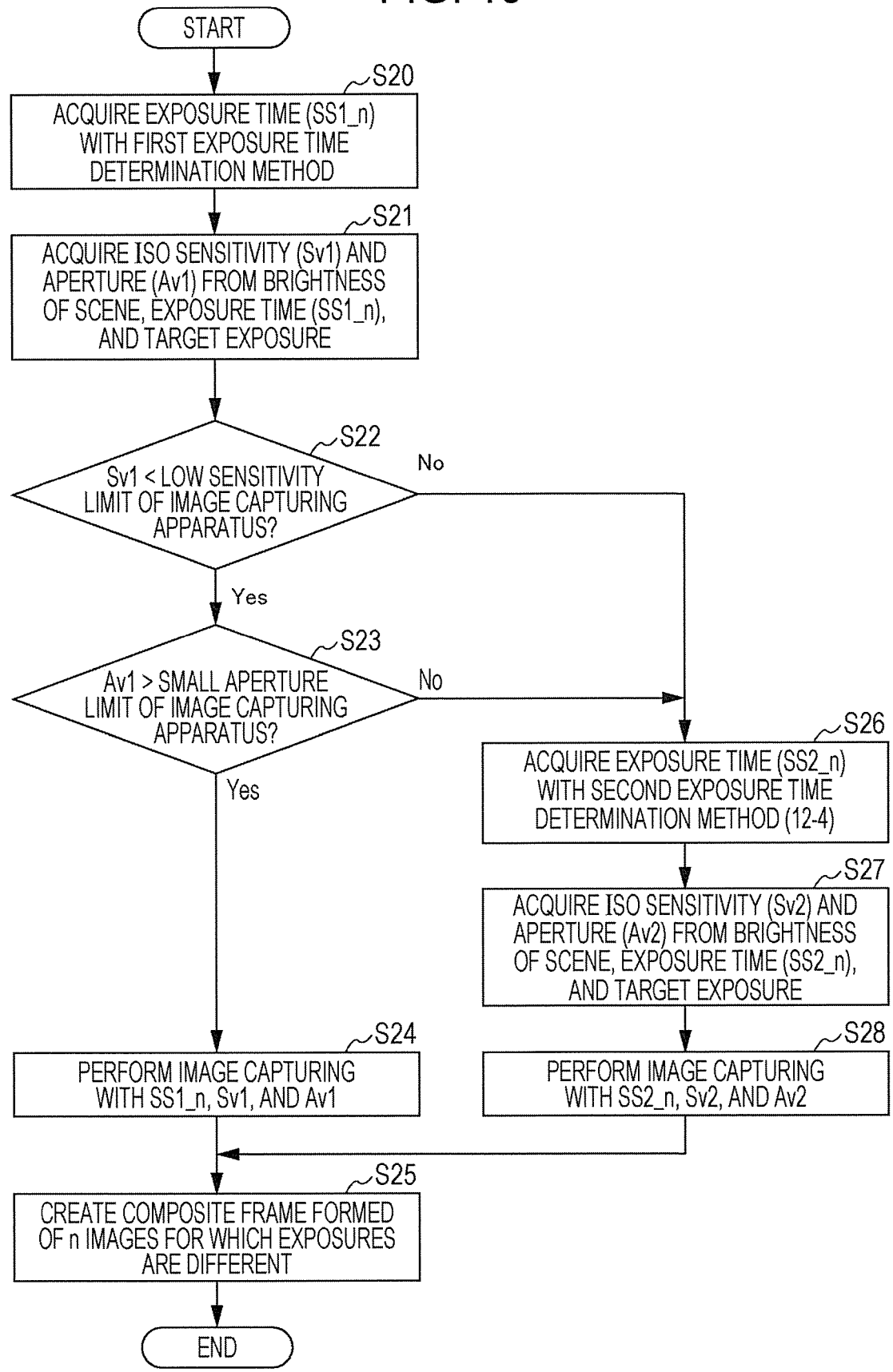
FIG. 10 is a flowchart illustrating operations of the image capturing apparatus.

FIG. 10 is a flowchart illustrating operations of the image capturing apparatus 1 according to this embodiment.

The exposure time setting unit 101 acquires an exposure time $SS1\_n$ with the first exposure time determination method (step S20). Next, the exposure time setting unit 101 acquires an ISO sensitivity (Sv1) and an aperture (Av1) from the brightness of the scene, the exposure time ($SS1\_n$), and a target exposure (step S21). The exposure time setting unit 101 acquires the ISO sensitivity (Sv1) and the aperture (Av1) in accordance with, for example, a parameter indicating a relationship among the exposure time, ISO sensitivity, and aperture stored in advance on the image capturing apparatus 1.

Next, the exposure time setting unit 101 determines whether the acquired ISO sensitivity (Sv1) is smaller than a low sensitivity limit of the image capturing apparatus 1 (step S22).

In a case where the exposure time setting unit 101 determines that the ISO sensitivity (Sv1) is smaller than the low sensitivity limit of the image capturing apparatus 1, the exposure time setting unit 101 subsequently determines whether the acquired aperture (Av1) is larger than a small aperture limit of the image capturing apparatus 1 (step S23).

In a case where the acquired aperture (Av1) is larger than the small aperture limit of the image capturing apparatus 1, the exposure control unit 103 causes image capturing to be performed with the exposure time $SS1\_n$, Sv1, and Av1 (step S24). The image data acquisition unit 105 acquires n pieces of image data that are acquired with exposure for the exposure times set with the first exposure time determination method and for which the exposures are different, and the composite frame generation unit 107 generates a composite frame (step S25).

On the other hand, in a case where the acquired ISO sensitivity (Sv1) is larger than the low sensitivity limit of the camera or in a case where the acquired aperture (Av1) is smaller than the small aperture limit of the image capturing apparatus 1, the exposure time setting unit 101 acquires an exposure time $SS2\_n$ with the second exposure time determination method (step S26). Next, the exposure time setting unit 101 acquires an ISO sensitivity (Sv2) and an aperture (Av2) from the brightness of the scene, the exposure time ($SS2\_n$), and the target exposure (step S27). Thereafter, the exposure control unit 103 causes image capturing to be performed with the exposure time $SS2\_n$, Sv2, and Av2 (step S28). The image data acquisition unit 105 acquires n pieces of image data that are acquired with exposure for the exposure times set with the second exposure time determination method and for which the exposures are different, and the composite frame generation unit 107 generates a composite frame (step S25). Note that in a case of performing the above-described operations, the aperture is fixed and the ISO sensitivity is automatically set in the image capturing apparatus 1.

As described above, in this embodiment, the exposure times are determined with the first exposure time determination method or the second exposure time determination method in accordance with the brightness of the photographic subject. When the exposure times are determined with the first exposure time determination method, the exposure times are longer than those determined with the second exposure time determination method, and image capturing can be performed with low sensitivity even for a scene where the photographic subject is dark. Accordingly, a motion picture in which noise is suppressed can be acquired. On the other hand, when the exposure times are determined with the second exposure time determination method, image capturing can be performed with high sensitivity even for a bright scene, and an exposure associating area can be made wider.

Others

The example where the exposure time setting unit 101 calculates the exposure times of composition target frames has been described above; however, the present invention is not limited to this. For example, the exposure time setting unit 101 sets the n exposure times on the basis of exposure information stored in a storage unit (control memory 30). The exposure information is information for determining the exposure times of composition target frames. Specifically, the exposure information is information that can be used to derive predetermined exposure times on the basis of the frame rate (fps) for motion picture capturing and the number of composition target frames.

Examples of the present invention have been described above; however, the present invention is not limited to the above-described embodiments, and various modifications can be made without departing from the spirit of the present invention as a matter of course.

REFERENCE SIGNS LIST 1 image capturing apparatus
8 display unit
10 external memory
12 lens
14 diaphragm
20 mechanical shutter
21 imaging element
22 processing unit
23 A/D conversion unit
24 main memory
25 system control unit
26 sensor driving unit
27 shutter driving unit
28 diaphragm driving unit
29 lens driving unit
30 control memory
31 image processing unit
32 compression/decompression unit
33 storage control unit
35 display control unit
36 user interface
101 exposure time setting unit
103 exposure control unit
105 image data acquisition unit
107 composite frame generation unit S10 to S13 first image capture process
S20 to S28 third image capture process

What is claimed is:

1. An image capturing apparatus comprising:
an imaging sensor; and
a processor configured to
set n exposure times for n successive frames, where n is an integer equal to or larger than two and the n exposure times are different from each other;
control the imaging sensor to capture then successive frames with the n exposure times so as to make a blank period between frames shorter than the n exposure times;
acquire n pieces of image data of the n successive frames captured by the imaging sensor; and
generate a composite frame for recording or displaying a motion picture of an extended dynamic range from the n pieces of image data,
wherein the processor is further configured to set the n exposure times so that a sum of the n exposure times matches a time for n frames for the composite frame or a time for one frame for the composite frame in accordance with a brightness of a photographic subject captured by the imaging sensor,
wherein the processor is further configured to set the n exposure times on the basis of expression (1) below:

$$SS\_i = \left( \frac{(t \times n) \times 2^{\Delta Ev\_i}}{\sum_{k=1}^{n} 2^{\Delta Ev\_k}} \right) - (n \times H) \quad (1)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
ΔEv_i: an exposure difference from a brightest composition target frame.

2. The image capturing apparatus according to claim 1, wherein the processor is further configured to set the n exposure times on the basis of exposure information stored in a storage unit.

3. The image capturing apparatus according to claim 2, wherein the processor is further configured to control the imaging sensor to make the blank period between frames shorter to an extent that almost no attention is required relative to the n exposure times.

4. The image capturing apparatus according to claim 2, wherein the blank period is a time lag between reading of image data from the imaging sensor and a start of exposure for new image data.

5. The image capturing apparatus according to claim 1, wherein the processor is further configured to control the imaging sensor to make the blank period between frames shorter to an extent that almost no attention is required relative to the n exposure times.

6. The image capturing apparatus according to claim 1, wherein the blank period is a time lag between reading of image data from the imaging sensor and a start of exposure for new image data.

7. An image capturing apparatus comprising:
an imaging sensor; and
a processor configured to
set n exposure times for n successive frames, where n is an integer equal to or larger than two and the n exposure times are different from each other;
control the imaging sensor to capture the n successive frames with the n exposure times so as to make a blank period between frames shorter than the n exposure times;
acquire n pieces of image data of the n successive frames captured by the imaging sensor; and
generate a composite frame for recording or displaying a motion picture of an extended dynamic range from the n pieces of image data,
wherein the processor is further configured to set the n exposure times so that a sum of the n exposure times matches a time for n frames for the composite frame or a time for one frame for the composite frame in accordance with a brightness of a photographic subject captured by the imaging sensor,
wherein the processor is further configured to set the n exposure times on the basis of expression (2) below:

$$SS\_i = \left( \frac{t \times 2^{\Delta Ev\_i}}{\sum_{k=1}^{n} 2^{\Delta Ev\_k}} \right) - (n \times H) \quad (2)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
ΔEv_i: an exposure difference from a brightest composition target frame.

8. The image capturing apparatus according to claim 7, wherein the processor is further configured to control the imaging sensor to make the blank period between frames shorter to an extent that almost no attention is required relative to the n exposure times.

9. The image capturing apparatus according to claim 7, wherein the blank period is a time lag between reading of image data from the imaging sensor and a start of exposure for new image data.

10. An image capturing method comprising:
setting n exposure times for n successive frames, where n is an integer equal to or larger than two and the n exposure times are different from each other;
controlling the imaging sensor to capture the n successive frame with the n exposure times so as to make a blank period between frames shorter than the n exposure times;
acquiring n pieces of age data of the n successive frames captured by the image sensor; and
generating a composite frame for recording or displaying a motion picture of an extended dynamic range from the n pieces of image data,
wherein the n exposure times are set so that a sum of the n exposure times matches a time for n frames for the composite frame match or a time for one frame for the composite frame in accordance with a brightness of a photographic subject captured by the imaging sensor, wherein the n exposure times are set on the basis of expression (1) below:

$$SS\_i = \left( \frac{(t \times n) \times 2^{\Delta Ev\_i}}{\sum_{k=1}^{n} 2^{\Delta Ev\_k}} \right) - (n \times H) \quad (1)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
ΔEv_i: an exposure difference from a brightest composition target frame.

11. The image capturing method according to claim 10, wherein the blank period between frames is shorter to an extent that almost no attention is required relative to the n exposure times.

12. An image capturing method comprising:
setting n exposure times for n successive frames, where n is an integer equal to or larger than two and the n exposure times are different from each other;
controlling the imaging sensor to capture the n successive frame with the n exposure times so as to make a blank period between frames shorter than the n exposure times;
acquiring n pieces of image data of the n successive frames captured by the image sensor; and
generating a composite frame for recording or displaying a motion picture of an extended dynamic range from the n pieces of image data,
wherein the n exposure times are set so that a sum of the n exposure times matches a time for n frames for the composite frame match or a time for one frame for the composite frame in accordance with a brightness of a photographic subject captured by the imaging sensor,
wherein the n exposure times are set on the basis of expression (2) below:

$$SS\_i = \left( \frac{t \times 2^{\Delta Ev\_i}}{\sum_{k=1}^{n} 2^{\Delta Ev\_k}} \right) - (n \times H) \quad (2)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
ΔEv_i: an exposure difference from a brightest composition target frame.

13. The image capturing method according to claim 12, wherein the blank period is a time lag between reading of image data from the imaging sensor and a start of exposure for new image data.

14. A non-transitory computer readable medium for storing a program for causing a computer to perform a process comprising:
setting n exposure times for n successive frames, where n is an integer equal to or larger than two and the n exposure times are different from each other;
controlling the imaging sensor to capture the n successive frames with the set n exposure times so as to make a blank period between frames shorter than the n exposure times;
acquiring from the imaging sensor n pieces of image data of the n successive frames; and
generating a composite frame for recording or displaying a motion picture of an extended dynamic range from the n pieces of image data,
wherein, the n exposure times is set so that a sum of the n exposure times matches a time for n frames for the composite frame a time for one frame for the composite frame in accordance with a brightness of a photographic subject captured by the imaging sensor,
wherein then exposure times are set on the basis of expression (1) below:

$$SS\_i = \left( \frac{(t \times n) \times 2^{\Delta Ev\_i}}{\sum_{k=1}^{n} 2^{\Delta Ev\_k}} \right) - (n \times H) \quad (1)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
ΔEv_i: an exposure difference from a brightest composition target frame.

15. The non-transitory computer readable medium according to claim 14,
wherein the blank period between frames is shorter to an extent that almost no attention is required relative to the n exposure times.

16. A non-transitory computer readable medium for storing a program for causing a computer to perform a process comprising:
setting n exposure times for n successive frames, where n is an integer equal to or larger than two and the n exposure times are different from each other;
controlling the imaging sensor to capture the n successive frames with the set n exposure times so as to make a blank period between frames shorter than the n exposure times;
acquiring from the imaging sensor n pieces of image data of the n successive frames; and
generating a composite frame for recording or displaying a motion picture of an extended dynamic range from the n pieces of image data,
wherein, the n exposure times is set so that a sum of the n exposure times matches a time for n frames for the composite frame a time for one frame for the composite frame in accordance with a brightness of a photographic subject captured by the imaging sensor,
wherein the n exposure times are set on the basis of expression (2) below:

$$SS\_i = \left( \frac{t \times 2^{\Delta Ev\_i}}{\sum_{k=1}^{n} 2^{\Delta Ev\_k}} \right) - (n \times H) \qquad (2)$$

where t: the number of seconds per motion picture frame;
n: the number of composition target frames for acquiring the composite frame;
H: a time lag necessary between a read start pulse and an electronic shutter start pulse;
SS_i: the exposure time for acquiring each piece of image data;
i: a natural number from 1 to n representing a number of each composition target frame; and
$\Delta Ev\_i$: an exposure difference from a brightest composition target frame.

17. The non-transitory computer readable medium according to claim 16,
   wherein the blank period between frames is shorter to an extent that almost no attention is required relative to the n exposure times.

\* \* \* \* \*